United States Patent
Pathak et al.

(10) Patent No.: US 12,101,126 B1
(45) Date of Patent: Sep. 24, 2024

(54) OPTICAL COHERENT RECEIVER HAVING AN OPTICAL HYBRID CONFIGURATION WITH REDUCED PHASE ERROR

(71) Applicant: LUMENTUM TECHNOLOGY UK LIMITED, Northamptonshire (GB)

(72) Inventors: Shibnath Pathak, San Jose, CA (US); Amit Mizrahi, San Jose, CA (US)

(73) Assignee: Lumentum Technology UK Limited, Northamptonshire (GB)

( * ) Notice: Subject to any disclaimer, the term of this patent is extended or adjusted under 35 U.S.C. 154(b) by 0 days.

(21) Appl. No.: 18/318,103

(22) Filed: May 16, 2023

Related U.S. Application Data

(60) Provisional application No. 63/489,316, filed on Mar. 9, 2023.

(51) Int. Cl.
  *H04B 10/61* (2013.01)
(52) U.S. Cl.
  CPC ....... *H04B 10/6165* (2013.01); *H04B 10/613* (2013.01); *H04B 10/615* (2013.01)
(58) Field of Classification Search
  CPC ................ H04B 10/613; H04B 10/615; H04B 10/6165; G02B 6/215
  USPC ....................................................... 399/202
  See application file for complete search history.

(56) References Cited

U.S. PATENT DOCUMENTS

| | | | |
|---|---|---|---|
| 10,126,498 B1 * | 11/2018 | Ma | G02F 1/011 |
| 11,048,042 B2 | 6/2021 | Pathak et al. | |
| 11,982,839 B2 * | 5/2024 | Jizodo | G02B 6/125 |
| 2022/0091337 A1 * | 3/2022 | Dong | G02B 6/29302 |

FOREIGN PATENT DOCUMENTS

JP   2021-148965   * 9/2021

OTHER PUBLICATIONS

Guan et al., "Compact and low loss 90° optical hybrid on a silicon-on-insulator platform," Optics Express, Nov. 13, 2017, vol. 25, No. 23, Optical Society of America. 12 pages.
Adar et al., "Phase Coherence of Optical Waveguides," Apr. 1994, Journal of Lightwave Technology, vol. 12, No. 4, Institute of Electrical and Electronics Engineers, pp. 603-606.
Pathak et al., "Waveguide Bends for Suppressed Mode Coupling," Feb. 2020, IEEE Journal of Quantum Electronics, vol. 56, No. 1, 10 pages.

* cited by examiner

*Primary Examiner* — Hoan H Tran
(74) *Attorney, Agent, or Firm* — Harrity & Harrity, LLP

(57) ABSTRACT

An optical coherent receiver includes a 90-degree optical hybrid configured to receive an input signal and a reference signal, and mix the input signal with four quadrature states associated with the reference signal to generate four output signals. The 90-degree optical hybrid includes a plurality of 3-dB couplers; and a plurality of optical waveguides, wherein each optical waveguide of the plurality of optical waveguides couples two respective 3-dB couplers of the plurality of 3-dB couplers, and wherein each optical waveguide of the plurality of optical waveguides has a same optical path length. Each optical waveguide of the plurality of optical waveguides is dimensioned according to a figure of merit (FoM) to reduce a phase error.

20 Claims, 6 Drawing Sheets

OPTICAL COHERENT RECEIVER HAVING AN OPTICAL HYBRID CONFIGURATION WITH REDUCED PHASE ERROR

CROSS-REFERENCE TO RELATED APPLICATION

This Patent Application claims priority to U.S. Patent Application No. 63/489,316, filed on Mar. 9, 2023. The disclosure of the prior Application is considered part of and is incorporated by reference into this Patent Application.

TECHNICAL FIELD

The present disclosure relates generally to optical coherent receivers with an optical hybrid configuration.

BACKGROUND

An optical coherent receiver may be used to receive an optical signal (e.g., an optical data signal, such as an optical communication signal) and convert the optical signal into an electrical signal that can be read by an electronic device. The optical signal may be transmitted as pulses of light that can be translated into information. For example, the optical coherent receiver may be coupled to a fiber optic network for receiving the optical signal and may convert the optical signal into one or more electrical signals that is representative of the information transmitted by the optical signal. The optical coherent receiver may include one or more photodiodes that are configured to convert the optical signal into electrical signals (e.g., data signals). Thus, the optical coherent receiver may be used to recover information transmitted through the fiber optic network.

In an optical coherent receiver, a 90-degree optical hybrid, also referred to as a 3-dB optical coupler, is an optical device that may be used to combine or split optical signals. The 90-degree optical hybrid may be used to demodulate an incoming optical signal in quadrature amplitude modulation (QAM) format. Thus, the 90-degree optical hybrid may be used in in various applications, including fiber-optic communication systems and coherent detection systems. Coupling light between optical components of the 90-degree optical hybrid may be achieved using a network of waveguides. A waveguide can be fabricated on and/or in a photonic integrated circuit, and can be used for efficient coupling or routing. Some waveguides may support multiple propagating modes. In such cases, a bend curvature of a waveguide bend may result in coupling into higher order modes, which may cause negative impacts to circuit elements downstream from the waveguide bend (e.g., downstream with respect to a transmission of optical signals through the waveguide bend).

SUMMARY

In some implementations, an optical coherent receiver includes a 90-degree optical hybrid configured to receive an input signal and a reference signal, and mix the input signal with four quadrature states associated with the reference signal to generate four output signals, wherein the 90-degree optical hybrid comprises: a plurality of 3-dB couplers; and a plurality of optical waveguides, wherein each optical waveguide of the plurality of optical waveguides couples two respective 3-dB couplers of the plurality of 3-dB couplers, and wherein each optical waveguide of the plurality of optical waveguides has a same optical path length, wherein each optical waveguide of the plurality of optical waveguides is dimensioned according to a figure of merit (FoM) to reduce a phase error, and wherein the FoM is defined by:

$$FoM = \frac{dneff}{dw}\sqrt{L},$$

wherein $dn_{eff}$ denotes a variation in an effective refractive index of a waveguide transverse mode of an optical waveguide, L denotes a total length of the optical waveguide, and dw denotes a width variation of a width of the optical waveguide.

In some implementations, an optical hybrid includes a first input configured to receive an input signal; a second input configured to receive a reference signal; a plurality of optical components configured to mix the input signal with four quadrature states associated with the reference signal to generate four output signals; and a plurality of optical waveguides, wherein each optical waveguide of the plurality of optical waveguides couples two respective optical components of the plurality of optical components, and wherein each optical waveguide of the plurality of optical waveguides has a same optical path length, wherein each optical waveguide of the plurality of optical waveguides is dimensioned according to a figure of merit (FoM) to reduce the phase error, and wherein the FoM is defined by:

$$FoM = \frac{dneff}{dw}\sqrt{L},$$

wherein $dn_{eff}$ denotes a variation in an effective refractive index of a waveguide transverse mode of an optical waveguide, L denotes a total length of the optical waveguide, and dw denotes a width variation of a width of the optical waveguide.

In some implementations, an optical hybrid includes a first input configured to receive an input signal; a second input configured to receive a reference signal; a plurality of optical components configured to mix the input signal with four quadrature states associated with the reference signal to generate four output signals; and a connecting waveguide network comprising a plurality of optical waveguide paths, wherein each optical waveguide path of the plurality of optical waveguide paths couples two respective optical components of the plurality of optical components, and wherein each optical waveguide path of the plurality of optical waveguide paths has a same optical path length, wherein each optical waveguide path of the plurality of optical waveguide paths is dimensioned according to a figure of merit (FoM) to reduce a phase error, and wherein the FoM is defined by:

$$FoM = \frac{dneff}{dw}\sqrt{L},$$

wherein $dn_{eff}$ denotes a variation in an effective refractive index of a waveguide transverse mode of an optical waveguide path, L denotes a total length of the optical waveguide path, and dw denotes a width variation of a width of the optical waveguide path.

DETAILED DESCRIPTION

Figure 1A:
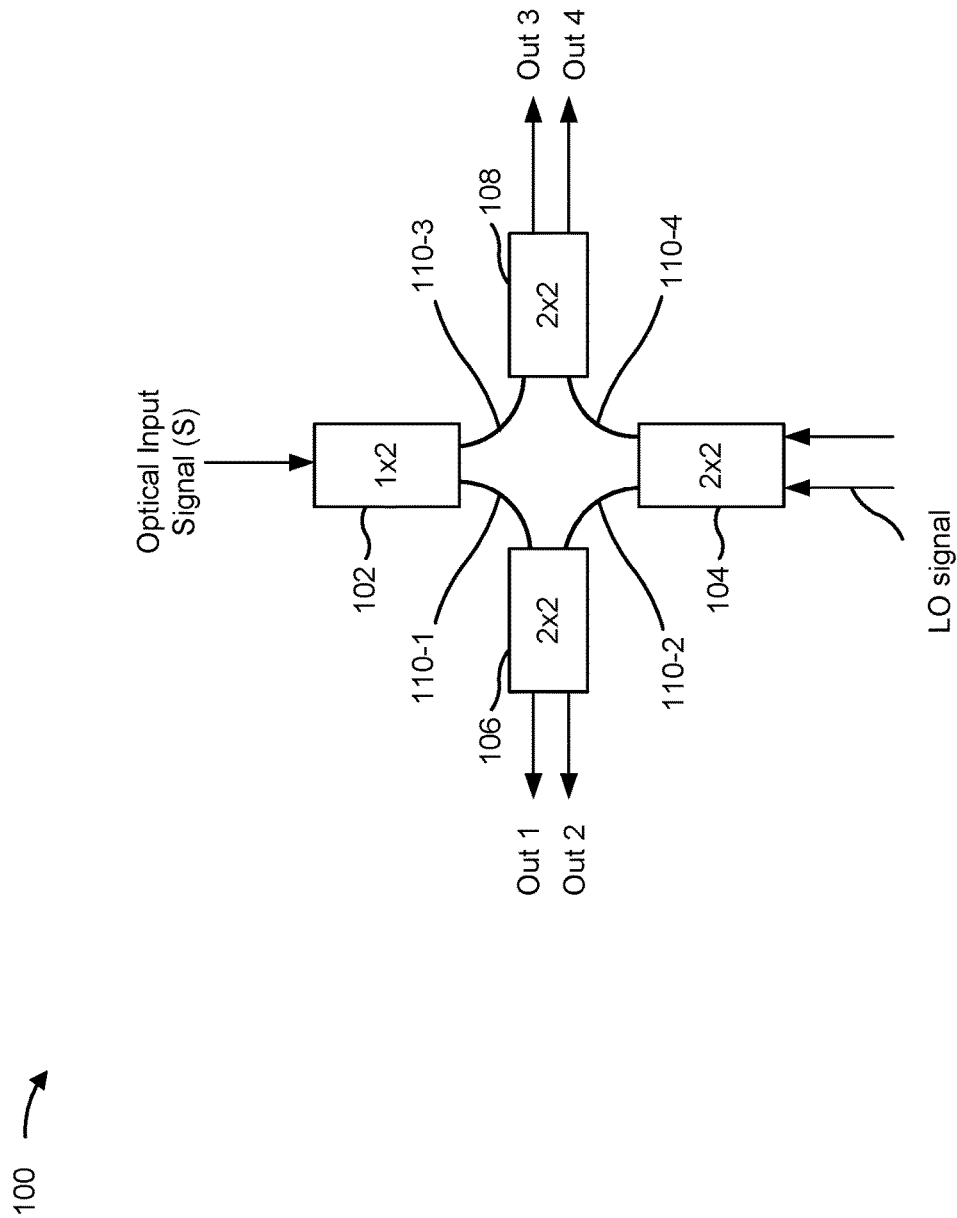
FIGS. 1A and 1B show a 90-degree optical hybrid of an optical coherent receiver according to one or more implementations.

The following detailed description of example implementations refers to the accompanying drawings. The same reference numbers in different drawings may identify the same or similar elements.

An optical receiver may be used to receive an optical signal (e.g., an optical data signal, such as an optical communication signal) and convert the optical signal into an electrical signal that can be read by an electronic device. In an optical coherent receiver, a 90-degree optical hybrid, also referred to as a 3-dB optical coupler, may be used to demodulate an incoming optical signal in QAM format. An optical hybrid receiver that provides good common mode rejection (CMRR) and responsivity may be comprised of a single 1×2 multi-mode interferometer (MMI) coupler and three 2×2 MMI coupler. In some cases, an MMI may be referred to as a multimode interference coupler. The input and output paths of the MMI couplers are coupled to waveguides that route light to and from the MMI couplers. Practically speaking, waveguides used for routing light between the MMI couplers within the optical hybrid receiver may generate a large phase error due to waveguide imperfections, thus degrading performance and yield of the optical coherent receiver. One solution may be to actively tune the phase of the light routed by the waveguides by using heaters on the waveguides. However, adding heaters to the waveguides increases a complexity of the optical coherent receiver, which increases cost. In addition, adding heaters to the waveguides increases power consumption of the optical coherent receiver.

Furthermore, common practice is not to bend waveguides having wide widths since multi-mode waveguide bends (e.g., waveguides with wider widths) excite higher order modes, which can reduce performance (e.g., by causing phase errors). In other words, whether a waveguide is a single mode or a multi-mode waveguide can be determined by a width of a core (e.g., a fiber core that transports light) of the waveguide, where a waveguide that has a core that exceeds a certain width is known to support multiple modes and becomes known as a multi-mode waveguide. It is common practice not to bend multi-mode waveguides because light may be excited from a fundamental mode to one or more higher order modes when the light interacts with the sidewalls of the multi-mode waveguides (e.g., the sidewalls of the core) due to the bend. An excitation from the fundamental mode to a higher order mode is known to cause phase error in the transported light.

Some implementations provide an optical coherent receiver that includes routing wide waveguides that have wide waveguide bends such that a phase error of routed light is reduced. Accordingly, the waveguides may be routed between optical hybrid components of the optical coherent receiver in a way (e.g., using wide waveguide bends) that reduces, and in some cases greatly reduces, phase errors. For example, a routing configuration of the waveguides relies on bending wide waveguides within the 90-degree optical hybrid, thus keeping light traveling along the wide waveguides away from the sidewalls of the wide waveguides and reducing the phase error that would be otherwise generated from an interaction with the sidewalls.

In some implementations, each waveguide couples two respective MMI couplers of the 90-degree optical hybrid. Furthermore, each waveguide has a same optical path length to ensure optical signals being routed through the 90-degree optical hybrid each undergo a same or similar phase shift in order to reduce phase errors between the optical signals. Furthermore, each waveguide is dimensioned according to a figure of merit (FoM) to reduce phase errors between the optical signals. The FoM is defined by:

$$FoM = \frac{dn_{\mathit{eff}}}{dw}\sqrt{L},$$

wherein $dn_{\mathit{eff}}$ denotes a variation in an effective refractive index of a waveguide transverse mode of an optical waveguide, L denotes a total length of the optical waveguide, and dw denotes a width variation of a width of the optical waveguide.

Accordingly, a routing configuration and a dimensioning of the waveguides that reduces phase error may improve performance and yield of the optical coherent receiver. In addition, the routing configuration and the dimensioning of the waveguides with reduced phase error may eliminate a need for actively tuning a phase on the waveguides, for example, by using heaters to tune the phase. Thus, design complexity and power consumption of the optical coherent receiver may be reduced, which may reduce costs.

The routing configuration and the dimensioning of the waveguides may use wide waveguides with wide waveguide bends to reduce the phase error without excitation to a higher order mode. Use of the wide waveguide bends may provide significant improvement to the optical hybrid design, which may eliminate a requirement of using phase shifters (e.g., heaters) on all arm segments (e.g., routing segments). Therefore, the routing configuration and the dimensioning of the waveguides according to the FoM may reduce the total power consumption, reduce an electrical control loop, and also reduce a total footprint of the 90-degree optical hybrid. Thus, the routing configuration and the dimensioning of the waveguides with wide widths and with wide waveguide bends within an optical hybrid configuration may be used to achieve reduced phase error and high yield in an optical coherent receiver. Low phase errors, zero phase errors, or phase errors of substantially zero may be achieved by the routing configuration of the waveguides and by the dimensioning of the waveguides according to the FoM.

The routing configuration and the dimensioning of the waveguides may be extended to any type of interferometer in which a built-in phase is important (e.g., a Mach-Zehnder interferometer with uneven arms). For example, a Mach-Zehnder interferometer is a device used to determine the relative phase shift variations between two collimated beams derived by splitting light from a single source. The Mach-Zehnder interferometer can be used, among other things, to measure phase shifts between the two beams caused by a sample or a change in length of one of the paths.

Figure 1B:
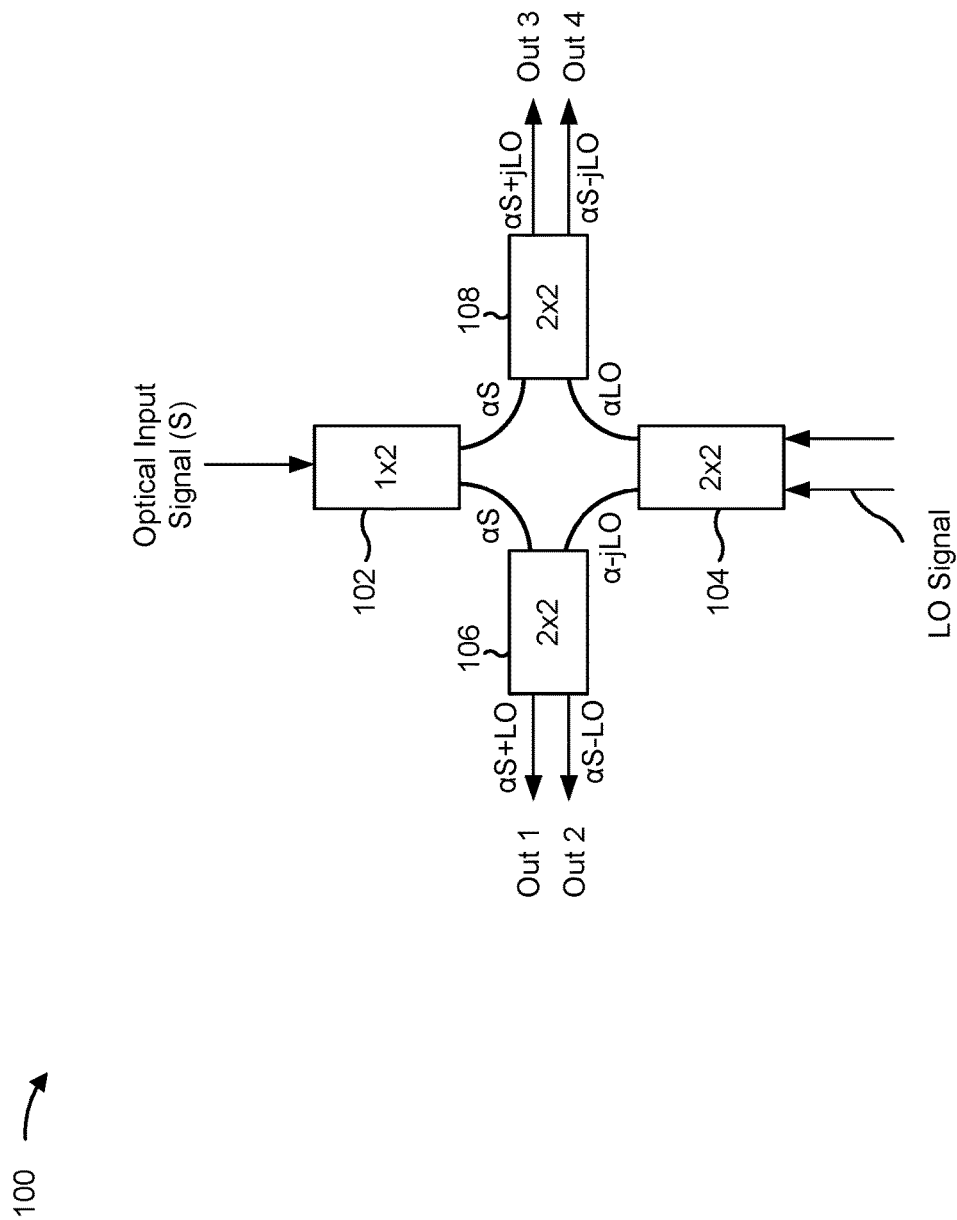

FIGS. 1A and 1B show a 90-degree optical hybrid 100 of an optical coherent receiver according to one or more implementations. The 90-degree optical hybrid 100 may be used to demodulate an incoming optical signal in QAM format. For example, the 90-degree optical hybrid 100 may be configured to receive an optical input signal (S) and an optical local oscillator (LO) signal as a reference signal, and mix the optical input signal with four quadrature states associated with the LO signal to generate four output signals, including Out 1, Out 2, Out 3 and Out 4. For example, the 90-degree optical hybrid 100 may include a plurality of optical components configured to mix the optical input signal with four quadrature states associated with the LO signal to generate the four output signals Out 1, Out 2, Out 3 and Out 4.

The 90-degree optical hybrid 100 may include a plurality of 3-dB couplers 102, 104, 106, and 108 as the optical components. The 3-dB couplers 102, 104, 106, and 108 may be MMI couplers, Y-branch couplers, directional couplers, adiabatic couplers, and/or evanescent couplers. The plurality of 3-dB couplers 102, 104, 106, and 108 are interconnected by a connecting optical waveguide network of a plurality of optical waveguides 110 (e.g., a plurality of routing waveguides 110-1, 110-2, 110-3, and 110-4). FIG. 1B shows phase relations between various optical signals that are output from the plurality of 3-dB couplers 102, 104, 106, and 108. One or more phase errors occur between the output signals Out 1, Out 2, Out 3 and Out 4 when one or more phases deviate from the phase relations shown in FIG. 1B.

The connecting optical waveguide network may include one or more cladding layers that surround a plurality of waveguide cores that are used to form the optical waveguides. For example, the plurality of waveguide cores may be made of a material that has a higher refractive index than a refractive index of the one or more cladding layers. For example, each optical waveguide of the plurality of optical waveguides 110 may be at least one of a silicon waveguide, an indium phosphide waveguide, a silicon nitride waveguide, a gallium arsenide waveguide, a polymer waveguide, a semiconductor waveguide, a lithium niobate waveguide, or a silica waveguide. That is, the waveguide cores may be made of silicon, an indium phosphide, a silicon nitride, a gallium arsenide, a polymer, a semiconductor, a lithium niobate, or a silica. In some implementations, the one or more cladding layers may be made of material that has more than one refractive index that is lower than the refractive index of the waveguide cores. The one or more classing layers may be made of an oxide, such as silicon dioxide ($SiO_2$). Thus, the waveguide cores may be used to form the waveguides along which respective optical signals propagate. In other words, each waveguide (e.g., each waveguide core) forms an optical path for carrying a respective optical signal through a connecting optical waveguide network of the 90-degree optical hybrid 100. Moreover, each waveguide core may have a width that supports multiple propagating modes. Thus, each optical waveguide of the connecting optical waveguide network may be a multi-mode optical waveguide.

A first 3-dB coupler 102 may be configured to receive the optical input signal and generate a first pair of output signals based on the optical input signal. For example, the first 3-dB coupler 102 may be a 1×2 3-dB coupler (e.g., a 1×2 MMI coupler) configured to receive and split the optical input signal. The 1×2 3-dB coupler may be used as a 3 dB splitter or 50-50 splitter to generate the first pair of output signals based on the input signal. The first pair of output signals may have a same phase.

A second 3-dB coupler 104 may be configured to receive the LO signal and generate a second pair of output signals based on the LO signal. For example, the second 3-dB coupler 104 may be a 2×2 3-dB coupler (e.g., a 2×2 MMI coupler) configured to receive and split the LO signal. The 2×2 3-dB coupler may be used as a 3 dB splitter or 50-50 splitter to generate the second pair of output signals based on the input signal. Additionally, the second pair of output signals may be shifted in phase, as shown in FIG. 1B. For example, the second pair of output signals may have a 900 phase-shift relative to each other. In some implementations, the optical input signal and the LO signal can be swapped such that the first 3-dB coupler 102 is configured to receive and split the LO signal and the second 3-dB coupler 104 is configured to receive and split the optical input signal.

A third 3-dB coupler 106 may be a 2×2 3-dB coupler (e.g., a 2×2 MMI coupler) that is configured to receive a first output of the first 3-dB coupler 102 and a first output of the second 3-dB coupler 104 as first inputs, split each of the first inputs, and apply opposing 900 phase shifts on one of the first inputs (e.g., the first output of the second 3-dB coupler 104). The third 3-dB coupler 106 may generate two outputs, Out 1 and Out 2. For example, the third 3-dB coupler 106 may be coupled to the first 3-dB coupler 102 by a first optical waveguide 110-1 of the plurality of optical waveguides for receiving a first output signal of the first pair of output signals, and coupled to the second 3-dB coupler 104 by a second optical waveguide 110-2 of the plurality of optical waveguides for receiving a first output signal of the second pair of output signals. The third 3-dB coupler 106 may be configured to generate a third pair of output signals (e.g., Out 1 and Out 2) based on the first output signal of the first pair of output signals and the first output signal of the second pair of output signals.

A fourth 3-dB coupler 108 may be a 2×2 3-dB coupler (e.g., a 2×2 MMI coupler) that is configured to receive a second output of the first 3-dB coupler 102 and a second output of the second 3-dB coupler 104 as second inputs, split each of the second inputs, and apply opposing 900 phase shifts on one of the second inputs (e.g., the second output of the second 3-dB coupler 104). The fourth 3-dB coupler 108 may generate two outputs, Out 3 and Out 4. For example, the fourth 3-dB coupler 108 may be coupled to the first 3-dB coupler 102 by a third optical waveguide 110-3 of the plurality of optical waveguides for receiving a second output signal of the first pair of output signals, and coupled to the second 3-dB coupler 104 by a fourth optical waveguide 110-4 of the plurality of optical waveguides for receiving a second output signal of the second pair of output signals. The fourth 3-dB coupler 108 may be configured to generate a fourth pair of output signals (e.g., Out 3 and Out 4) based on the second output signal of the first pair of output signals and the second output signal of the second pair of output signals.

Each of the output signals Out 1, Out 2, Out 3, and Out 4 provides a complex output signal with a different 90° phase shift applied relative to the LO signal. Each side of the outputs provides in-phase (I) and quadrature (Q) outputs for demodulation. Together, the output signals Out 1, Out 2, Out 3 and Out 4 form a constellation of received symbols.

Each of the optical waveguides (e.g., optical waveguides 110-1, 110-2, 110-3, and 110-4) of the plurality of optical waveguides 110 couples two respective 3-dB couplers of the plurality of 3-dB couplers 102, 104, 106, and 108. Additionally, each optical waveguide of the plurality of optical waveguides 110 has at least one respective bend section or curvature used for routing the optical waveguide through the connecting optical waveguide network for coupling two respective 3-dB couplers of the plurality of 3-dB couplers 102, 104, 106, and 108. In some implementations, each respective bend section may have a respective continuous curvature defined by a respective curvature function or a combination of curvature functions to reduce phase errors. Each respective curvature function may be configured to suppress an excitation of light to a higher order mode (e.g., a higher order transverse electric (TE) mode). For example, each respective curvature function may be one of a $sin^1$ curvature function, a $sin^2$ curvature function, a $sin^3$ curvature function, a $sin^4$ curvature function, a Dolph-Chebyshev curvature function, a $sin^2+sin^3$ curvature function, or Blackman-Nuttall window function. Each respective continuous curvature may have an effective radius that is configured to provide at least 35 dB suppression of a higher order mode.

In some implementations, each of the optical waveguides 110-1, 110-2, 110-3, and 110-4 may have a 90° bend section that comprises a bend of 90° or about 90° (e.g., 85° to 95° to account for manufacturing tolerances). Thus, the connecting waveguide network may have a minimum path length and without any crossing of the optical waveguides 110-1, 110-2, 110-3, and 110-4. Each respective 90° bend section may include a respective continuous curvature that transitions a respective optical waveguide from a first respective orientation to a second respective orientation that is perpendicular to the first respective orientation. In some implementations, each respective continuous curvature of a 90° bend section may be defined by one of the curvature functions to reduce a phase error.

Additionally, each optical waveguide of the plurality of optical waveguides 110 has a same optical path length to ensure optical signals being routed through the connecting optical waveguide network each undergo a same or similar phase shift in order to reduce phase errors between the output signals Out 1, Out 2, Out 3 and Out 4. In other words, each optical waveguide 110-1, 110-2, 110-3, and 110-4 accumulates a same phase.

Furthermore, each waveguide is dimensioned according to an FoM to reduce phase errors between the optical signals. The FoM is defined by:

$$FoM = \frac{dneff}{dw}\sqrt{L},$$

wherein $dn_{eff}$ denotes a variation in an effective refractive index of a waveguide transverse mode (e.g., $TE_0$) of an optical waveguide, L denotes a total length of the optical waveguide, and dw denotes a width variation of a width of the optical waveguide. Each optical waveguide of the plurality of optical waveguides 110 has a same optical path length, or a same total length L. However, due to fluctuations in dimensions and composition of an optical waveguide (e.g., fluctuations during manufacturing), an effective refractive index of a waveguide transverse mode $n_{eff}$ may deviate from an average effective refractive index by $dn_{eff}$. Similarly, the width of each optical waveguide may vary from an average width by a variation of width dw due to fluctuations during manufacturing. Each of the parameters $dn_{eff}$, dw, and L may refer to properties of the waveguide core (e.g., the refractive index, the width, and the length of the waveguide core). According to the FoM, the variation of width dw can be used to offset or compensate for $dn_{eff}$.

The FoM has been determined to have a direct correlation to phase accumulation within an optical waveguide as an optical signal propagates through the optical waveguide. Thus, the FoM of each of the optical waveguides 110-1, 110-2, 110-3, and 110-4 has a direct correlation to phase errors corresponding to the output signals Out 1, Out 2, Out 3 and Out 4. Accordingly, each of the optical waveguides 110-1, 110-2, 110-3, and 110-4 may be dimensioned to minimize a respective FoM in order to reduce any phase errors at the output signals Out 1, Out 2, Out 3 and Out 4. In some implementations, the each of the optical waveguides 110-1, 110-2, 110-3, and 110-4 may be dimensioned such that a respective FoM is less than one (1). In some implementations, the each of the optical waveguides 110-1, 110-2, 110-3, and 110-4 may be dimensioned such that a respective FoM is zero (0) or substantially zero.

Furthermore, each of the optical waveguides 110-1, 110-2, 110-3, and 110-4 may have an average width that is dimensioned such that a waveguide sensitivity to the FoM is reduced. For example, the average width may be set to be within a range, corresponding to a composition of the waveguide core, such that waveguide sensitivity to the FoM is reduced. In other words, each of the optical waveguides 110-1, 110-2, 110-3, and 110-4 may have an average width that is dimensioned such that a phase error sensitivity, based on the FoM, is reduced. For example, in some implementations, each of the optical waveguides 110-1, 110-2, 110-3, and 110-4 may be a multi-mode waveguide that has an average width selected from a range of 0.7 µm to 2.5 µm such that a waveguide sensitivity to the FoM and/or the phase error sensitivity of the waveguide is reduced. In some implementations, each of the optical waveguides 110-1, 110-2, 110-3, and 110-4 may be a multi-mode waveguide that has an average width selected from a range of 0.7 µm to 2.5 µm such that a waveguide sensitivity to $dn_{eff}$ is reduced. In some implementations, each of the optical waveguides 110-1, 110-2, 110-3, and 110-4 may be a multi-mode waveguide that has an average width selected from a range of 1 µm to 2 µm such that a waveguide sensitivity to the FoM and/or the phase error sensitivity of the waveguide is reduced. In some implementations, each of the optical waveguides 110-1, 110-2, 110-3, and 110-4 may be a multi-mode waveguide that has an average width selected from a range of 1 µm to 2 µm such that a waveguide sensitivity to $dn_{eff}$ is reduced. The range for the average width may depend on the composition and/or a height dimension h of the waveguide core. The average width may be dimensioned such the FoM is reduced to an operating zone corresponding to a minimized phase error.

By minimizing the FoM of the optical waveguides 110-1, 110-2, 110-3, and 110-4 and/or reducing a waveguide sensitivity to the FoM, wide (e.g., multi-mode) waveguides may be used in a 90-degree optical hybrid 100 with reduced or minimized phase error (e.g., the phase error is within an acceptable tolerance range for the application). Moreover, bend sections are typically needed in a 90-degree optical hybrid in order to route optical signals between optical components, such as 3-dB couplers. Due to minimizing the FoM, each of the optical waveguides 110-1, 110-2, 110-3, and 110-4 may include one or more bend sections for routing optical signals between two respective 3-dB couplers 102, 104, 106, or 108 with minimal to no phase error, which is below a quantity of phase error that is typically not possible when using wide (e.g., multi-mode) waveguides.

In some implementations, the optical waveguides 110-1, 110-2, 110-3, and 110-4 may be configured with wide bends, which reduces the interaction of light with the sidewalls of the optical waveguides 110, thus reducing phase error. In addition, the wide bends may be achieved with reduced excitation, no excitation, or substantially no excitation of higher order modes by engineering the bend curvature function of the optical waveguides 110-1, 110-2, 110-3, and 110-4.

For example, an effective radius Reff of the plurality of optical waveguides 110 may be configured with wide bends to provide greater than a 35 dB suppression of higher order mode excitations. For example, the effective radius Reff of the routing waveguides may be 50 µm or more. A weighted FoM of an entire waveguide routing including the waveguide bends in the connecting optical waveguide network may be about 0.5 $\mu m^{-1/2}$. For comparison, for 10 µm of routing of a fully etched waveguide with a width of 0.5 µm, commonly used in silicon photonics, a resulting FoM is about 4.7 $\mu m^{-1/2}$. Thus, the phase error accumulated by a routing configuration of the connecting optical waveguide network may be greatly reduced relative to conventional designs. In addition, the plurality of optical waveguides 110 may have tapered portions and the lengths of these tapered portions may be configured to provide low insertion loss. In some implementations, the plurality of optical waveguides 110 may not be fully etched, but may have a shoulder.

Thus, the waveguide bends of the plurality of optical waveguides 110 may greatly reduce excitation of higher order modes by engineering the bend curvature function and may reduce the interaction of light with the sidewalls, thus reducing phase error.

As indicated above, FIGS. 1A and 1B are provided as examples. Other examples may differ from what is described with regard to FIGS. 1A and 1B. The number and arrangement of devices and components shown in FIGS. 1A and 1B are provided as an example. In practice, there may be additional devices or components, fewer devices or components, different devices or components, or differently arranged devices or components than those shown in FIGS. 1A and 1B. For example, some applications (e.g., some optical coherent receivers) may use a 180-degree optical hybrid for pi-phase operation that includes a plurality of 3-dB couplers optically coupled by optical waveguides that are dimensioned as described above in connection with FIGS. 1A and 1B.

Figure 2A:
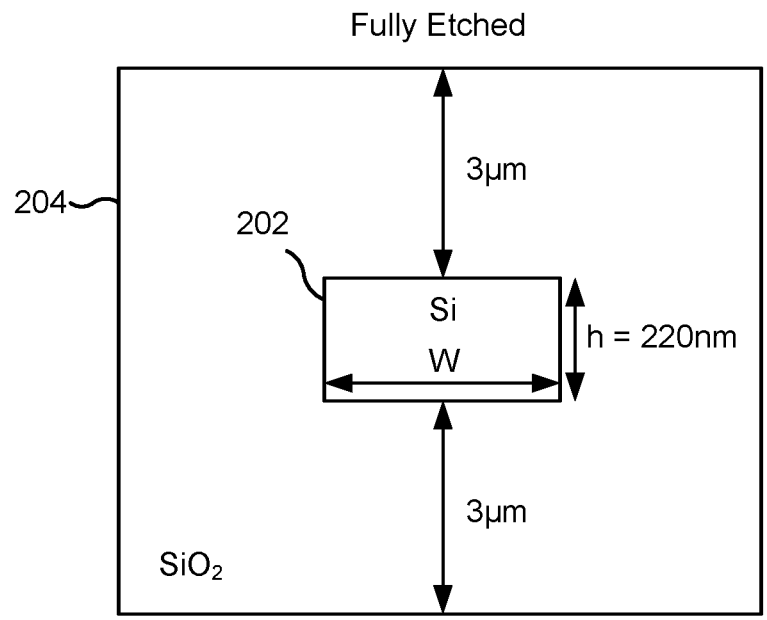
FIG. 2A shows a cross-section of an optical waveguide according to one or more implementations.

FIG. 2A shows a cross-section of an optical waveguide 200A according to one or more implementations. The optical waveguide 200A is a fully etched optical waveguide having a waveguide core 202 (e.g., a silicon core) surrounded by a cladding 204 (e.g., a SiO₂ cladding). The waveguide core 202 has a height dimension h (e.g., a thickness dimension) representative of an average height of the waveguide core 202, and a width dimension w representative of an average width of the waveguide core 202. For example, in some implementations, the height dimension h may be 210 nm or 220 nm, and the width dimension w may be set within a range of 0.7 µm to 2.5 µm such that a waveguide sensitivity to the FoM and/or the phase error sensitivity of the waveguide is reduced. Thus, the average width may be dimensioned such the FoM is reduced to an operating zone corresponding to a minimized phase error.

As indicated above, FIG. 2A is provided merely as an example. Other examples may differ from what is described with regard to FIG. 2A.

Figure 2B:
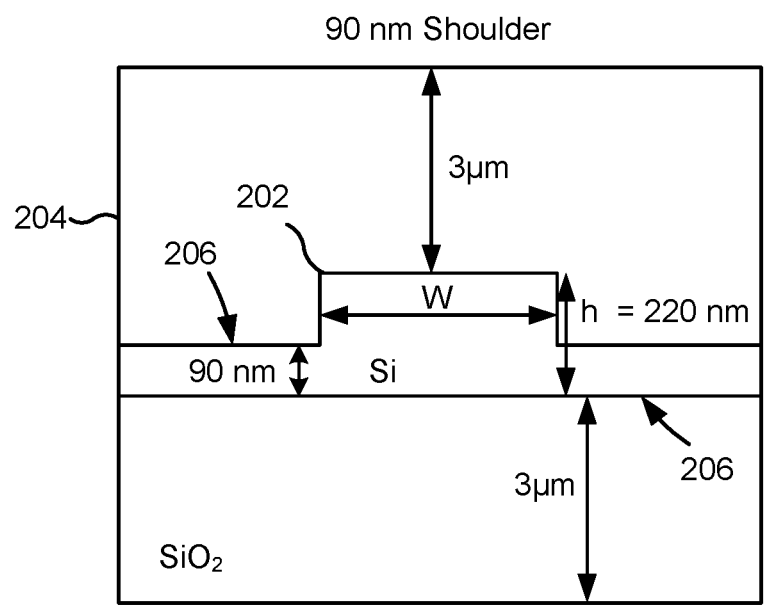
FIG. 2B shows a cross-section of an optical waveguide according to one or more implementations.

FIG. 2B shows a cross-section of an optical waveguide 200B according to one or more implementations. The optical waveguide 200B is an optical waveguide with a shoulder. The optical waveguide 200B has a waveguide core 202 (e.g., a silicon core) surrounded by a cladding 204 (e.g., a SiO₂ cladding), similar to the optical waveguide 200A. In addition, the optical waveguide 200B includes shoulder 206 that laterally extends from the waveguide core 202. The shoulder 206 is a lateral extension of the waveguide core 202 and has a same composition as the waveguide core 202. The waveguide core 202 has a height dimension h (e.g., a thickness dimension) representative of an average height of the waveguide core 202, and a width dimension w representative of an average width of the waveguide core 202. For example, in some implementations, the height dimension h may be 210 nm or 220 nm and the width dimension w may be set within a range of 0.7 µm to 2.5 µm such that a waveguide sensitivity to the FoM and/or the phase error sensitivity of the waveguide is reduced. Thus, the average width may be dimensioned such the FoM is reduced to an operating zone corresponding to a minimized phase error.

As indicated above, FIG. 2B is provided merely as an example. Other examples may differ from what is described with regard to FIG. 2B.

Figure 2C:
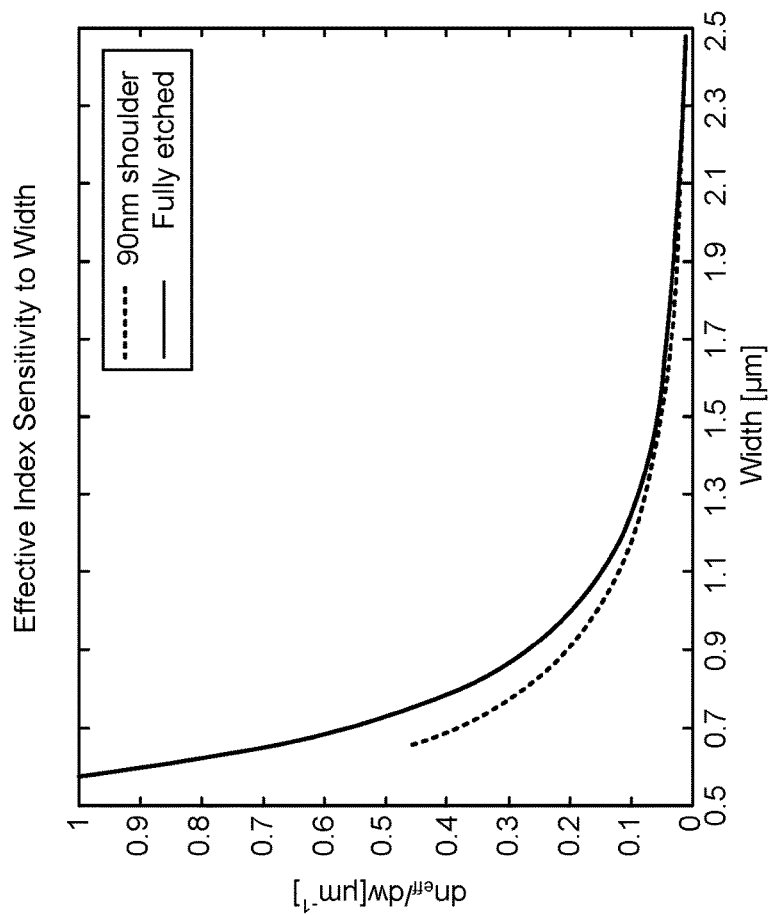
FIG. 2C shows a graph that plots an effective index sensitivity to a FoM relative to a width of an optical waveguide according to one or more implementations.

FIG. 2C shows a graph 200C that plots an effective index sensitivity to an FoM relative to a width of an optical waveguide according to one or more implementations. The greater the degree of sensitivity an optical waveguide is to the FOM, the more sensitive the optical waveguide is to a phase error. Thus, both a fully etched waveguide and a waveguide with a shoulder decrease in sensitivity to the FoM with increasing width (e.g., average width). Thus, the sensitivity to the FoM may be minimized by dimensioning the optical waveguides 10-1, 110-2, 110-3, and 110-4 with a width in a range of 0.7 µm to 2.5 µm. The dimensioning of the width may use used in conjunction with the dimensioning of the optical waveguide in view of a reduction of the FoM in order to tune an accumulated phase error within the optical waveguide to reduce phase errors occurring at the output signals Out 1, Out 2, Out 3 and Out 4.

As indicated above, FIG. 2C is provided merely as an example. Other examples may differ from what is described with regard to FIG. 2C.

Figure 2D:
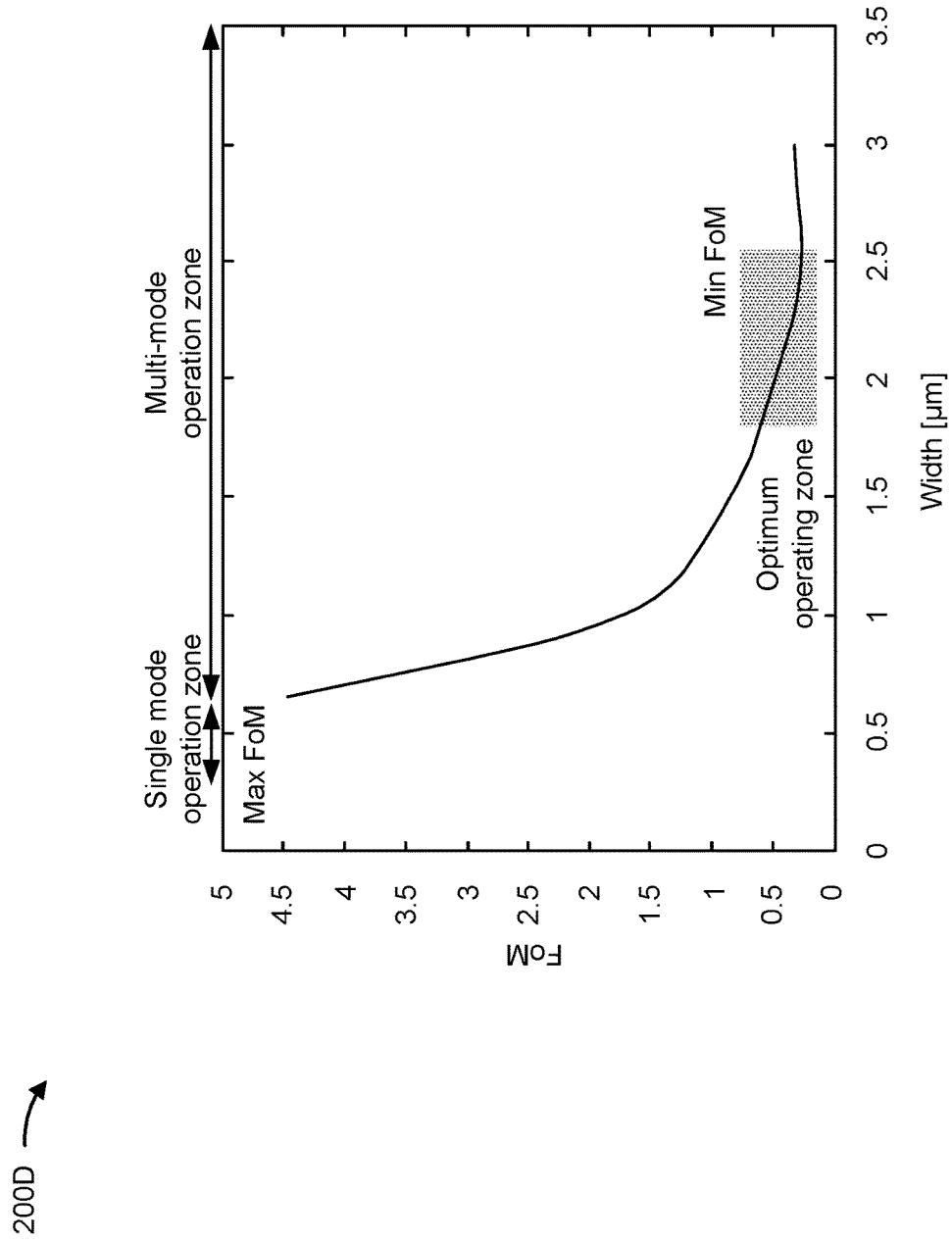
FIG. 2D shows a graph that plots FoM relative to a width of an optical waveguide according to one or more implementations.

FIG. 2D shows a graph 200D that plots FoM relative to a width of an optical waveguide according to one or more implementations. For any given waveguide platform, a single-mode operating zone has the worst FoM, but may have minimum device footprint. In contrast, a multi-mode operating zone may have an improved FoM, but may lead to a larger device footprint. Thus, using multi-mode waveguides may improve (i.e., reduce) the FoM. As shown, as the width of an optical waveguide (e.g., a width of the waveguide core) increases, the FoM reaches minimum FoM point. Increasing the width beyond the minimum FoM point causes the FoM to increase, as well as the device footprint. Thus, an optimum operating zone may be defined to be within a small deviation from of the minimum FoM (e.g., within a range of few percentage of the minimum FoM) without increasing with width beyond a width corresponding to the minimum FoM in order to not increase the footprint of the device too greatly. Here, the optimum operating zone may be defined by a FoM range of 0.25 to 0.8, with a minimum FoM point at 0.25, and a corresponding width range between 1.8 µm to 2.6 µm. In some implementations, the optical waveguides 10-1, 110-2, 110-3, and 110-4 may be dimensioned so that the FoM is less than 1.0.

Accordingly, the average width may be dimensioned such the FoM is reduced to an operating zone corresponding to a minimized phase error. The minimum FoM point may depend on the composition and/or a height dimension h of the waveguide core. As a result, the optical waveguides 10-1, 110-2, 110-3, and 110-4 may be dimensioned with an average width that the FoM and/or the sensitivity to the FoM is reduced to be within an optimum operating zone. As a result, wide waveguides, each with one or more waveguide bends, may be used to route optical signals between the 3-dB couplers 102, 104, 106, and 108 of the 90-degree optical hybrid 100.

As indicated above, FIG. 2D is provided merely as an example. Other examples may differ from what is described with regard to FIG. 2D.

Figure 3:
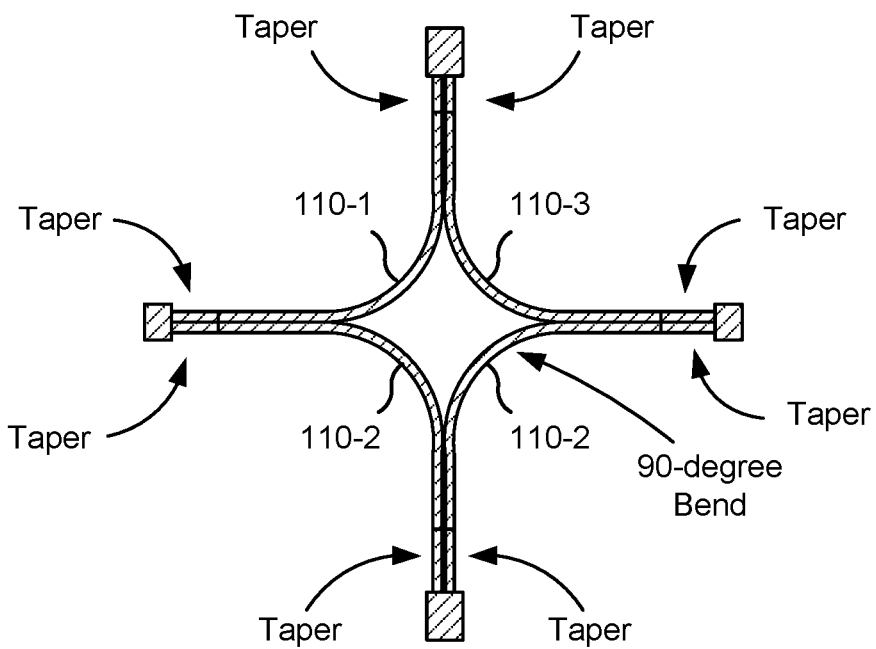
FIG. 3 shows a routing configuration of a connecting optical waveguide network according to one or more implementations.

FIG. 3 shows a routing configuration of a connecting optical waveguide network 300 according to one or more implementations. The connecting optical waveguide network 300 includes the optical waveguides 110-1, 110-2, 110-3, and 110-4. The optical waveguides 110-1, 110-2, 110-3, and 110-4 each have a 90° bend section that comprises a bend of 90° or about 90° (e.g., 85° to 95° to account for manufacturing tolerances). In addition, each of the optical waveguides 110-1, 110-2, 110-3, and 110-4 has at least one tapered portion (e.g., a tapered end) having a tapered length that is configured to minimize insertion loss.

An effective radius Reff of the plurality of optical waveguides 110 may be configured with wide bends to provide greater than a 35 dB suppression of higher order mode excitations. For example, the effective radius Reff of the routing waveguides may be 50 µm or more. A weighted FoM of an entire waveguide routing including the waveguide bends in the connecting optical waveguide network may be about 0.5 µm$^{-1/2}$. For comparison, for 10 µm of routing of a fully etched waveguide with a width of 0.5 µm, commonly used in silicon photonics, a resulting FoM is about 4.7 µm$^{-1/2}$. Thus, the phase error accumulated by a routing configuration of the connecting optical waveguide network may be greatly reduced relative to conventional designs. In addition, the plurality of optical waveguides 110 have tapered portions and the lengths of these tapered portions may be configured to provide low insertion loss.

As indicated above, FIG. 3 is provided merely as an example. Other examples may differ from what is described with regard to FIG. 3.

Figure 4:
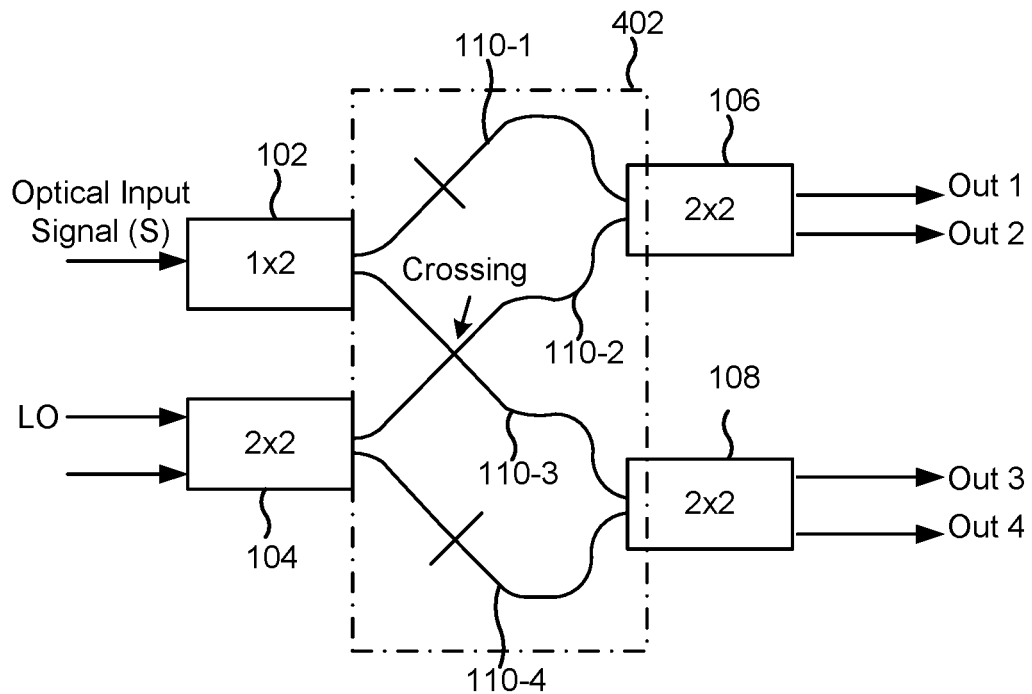
FIG. 4 shows a 90-degree optical hybrid of an optical coherent receiver according to one or more implementations.

FIG. 4 shows a 90-degree optical hybrid 400 of an optical coherent receiver according to one or more implementations. The 90-degree optical hybrid 400 is similar to the 90-degree optical hybrid 100 described in connection with FIGS. 1A and 1B, with the exception that connecting optical waveguide network 402 has a different routing configuration. The connecting optical waveguide network 402 includes the optical waveguides 110-1, 110-2, 110-3, and 110-4 that are configured to couple the 3-dB couplers 102, 104, 106, or 108. Each of the optical waveguides 110-1, 110-2, 110-3, and 110-4 has a same optical path length to ensure optical signals being routed through the 90-degree optical hybrid 400 each undergo a same or similar phase shift in order to reduce phase errors between the optical signals Out 1, Out 2, Out3, and Out 4. Furthermore, each waveguide is dimensioned according to the FoM to reduce phase errors between the optical signals. The FoM is defined by:

$$FoM = \frac{dneff}{dw}\sqrt{L},$$

wherein $dn_{eff}$ denotes a variation in an effective refractive index of a waveguide transverse mode of an optical waveguide, L denotes a total length of the optical waveguide, and dw denotes a width variation of a width of the optical waveguide.

However, the optical waveguides 110-1, 110-2, 110-3, and 110-4 may each include multiple bend sections with the same or different angles and may also include straight waveguide sections. In addition, the optical waveguides 110-2 and 110-3 have a crossing. The routing configuration of the connecting optical waveguide network 402 enables each of the optical inputs (e.g., the optical input signal and the LO signal) to be provide on one side of the 90-degree optical hybrid 400 and each of the optical signals Out 1, Out 2, Out3, and Out 4 to be provided on an opposite side of the 90-degree optical hybrid 400.

As indicated above, FIG. 4 is provided merely as an example. Other examples may differ from what is described with regard to FIG. 4.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An optical coherent receiver, comprising:
a 90-degree optical hybrid configured to receive an input signal and a reference signal, and mix the input signal with four quadrature states associated with the reference signal to generate four output signals, wherein the 90-degree optical hybrid comprises:
a plurality of 3-dB couplers; and
a plurality of optical waveguides, wherein each optical waveguide of the plurality of optical waveguides couples two respective 3-dB couplers of the plurality of 3-dB couplers, and wherein each optical waveguide of the plurality of optical waveguides has a same optical path length,
wherein each optical waveguide of the plurality of optical waveguides comprises one or more respective bend sections,
wherein each optical waveguide of the plurality of optical waveguides is dimensioned according to a figure of merit (FoM) to reduce a phase error, and wherein the FoM is defined by:

$$FoM = \frac{dneff}{dw}\sqrt{L},$$

wherein dneff denotes a variation in an effective refractive index of a waveguide transverse mode of an optical waveguide, L denotes a total length of the optical waveguide, and dw denotes a width variation of a width of the optical waveguide.

2. The optical coherent receiver of claim 1, wherein each optical waveguide accumulates a same phase.

3. The optical coherent receiver of claim 1, wherein each respective bend section comprises a respective continuous curvature defined by a respective curvature function to reduce the phase error, and
wherein each respective curvature function is configured to suppress an excitation of light to a higher order transverse electric (TE) mode.

4. The optical coherent receiver of claim 3, wherein each respective continuous curvature has an effective radius that is configured to provide at least 35 dB suppression of the higher order TE mode.

5. The optical coherent receiver of claim 3, wherein each respective curvature function includes at least one of:
a $\sin^1$ curvature function,
a $\sin^2$ curvature function,
a $\sin^3$ curvature function,
a $\sin^4$ curvature function, or
a Dolph-Chebyshev curvature function.

6. The optical coherent receiver of claim 1, wherein the plurality of 3-dB couplers include:
a first 3-dB coupler configured to receive the input signal and generate a first pair of output signals based on the input signal;
a second 3-dB coupler configured to receive the reference signal and generate a second pair of output signals based on the reference signal;
a third 3-dB coupler coupled to the first 3-dB coupler by a first optical waveguide of the plurality of optical waveguides for receiving a first output signal of the first pair of output signals, and coupled to the second 3-dB coupler by a second optical waveguide of the plurality of optical waveguides for receiving a first output signal of the second pair of output signals, wherein the third 3-dB coupler is configured to generate a third pair of output signals based on the first output signal of the first pair of output signals and the first output signal of the second pair of output signals; and
a fourth 3-dB coupler coupled to the first 3-dB coupler by a third optical waveguide of the plurality of optical waveguides for receiving a second output signal of the first pair of output signals, and coupled to the second 3-dB coupler by a fourth optical waveguide of the plurality of optical waveguides for receiving a second output signal of the second pair of output signals, wherein the fourth 3-dB coupler is configured to generate a fourth pair of output signals based on the second output signal of the first pair of output signals and the second output signal of the second pair of output signals.

7. The optical coherent receiver of claim 1, wherein the FoM is equal to 0 (zero) or substantially zero.

8. The optical coherent receiver of claim 7, wherein the FoM is directly correlated to the phase error.

9. The optical coherent receiver of claim 1, wherein each optical waveguide of the plurality of optical waveguides is dimensioned to minimize the FoM.

10. The optical coherent receiver of claim 1, wherein each optical waveguide of the plurality of optical waveguides has an average width that is dimensioned such that a waveguide sensitivity to the FoM is reduced.

11. The optical coherent receiver of claim 1, wherein each optical waveguide of the plurality of optical waveguides has an average width that is dimensioned such that a phase error sensitivity is reduced.

12. The optical coherent receiver of claim 1, wherein each optical waveguide of the plurality of optical waveguides is a multi-mode waveguide.

13. The optical coherent receiver of claim 1, wherein each optical waveguide of the plurality of optical waveguides is a fully etched waveguide having an average width that is dimensioned such that a waveguide sensitivity to the FoM is reduced.

14. The optical coherent receiver of claim 1, wherein each optical waveguide of the plurality of optical waveguides comprises a shoulder and a ridge, wherein the ridge has an average width that is dimensioned such that a waveguide sensitivity to the FoM is reduced, and wherein the shoulder extends laterally from the ridge.

15. The optical coherent receiver of claim 1, wherein each optical waveguide of the plurality of optical waveguides comprises at least one tapered portion having a tapered length configured to minimize insertion loss.

16. The optical coherent receiver of claim 1, wherein a weighted FoM of the plurality of optical waveguides is 0.4-0.6 $\mu m^{-1/2}$.

17. An optical hybrid, comprising:
a first input configured to receive an input signal;
a second input configured to receive a reference signal;

a plurality of optical components configured to mix the input signal with the reference signal to generate a plurality of output signals; and a plurality of optical waveguides, wherein each optical waveguide of the plurality of optical waveguides couples two respective optical components of the plurality of optical components, and wherein each optical waveguide of the plurality of optical waveguides has a same optical path length, wherein each optical waveguide of the plurality of optical waveguides is dimensioned according to a figure of merit (FoM) to reduce a phase error, and wherein the FoM is defined by:

$$FoM = \frac{dneff}{dw}\sqrt{L},$$

wherein dneff denotes a variation in an effective refractive index of a waveguide transverse mode of an optical waveguide, L denotes a total length of the optical waveguide, and dw denotes a width variation of a width of the optical waveguide.

18. The optical hybrid of claim 17, wherein the FoM is less than one.

19. The optical hybrid of claim 17, wherein each optical waveguide of the plurality of optical waveguides has an average width that is dimensioned such the FoM is reduced to an operating zone corresponding to a minimized phase error.

20. An optical hybrid, comprising:
a first input configured to receive an input signal;
a second input configured to receive a reference signal;
a plurality of optical components configured to mix the input signal with the reference signal to generate a plurality of output signals; and
a connecting waveguide network comprising a plurality of optical waveguide paths, wherein each optical waveguide path of the plurality of optical waveguide paths couples two respective optical components of the plurality of optical components, and wherein each optical waveguide path of the plurality of optical waveguide paths has a same optical path length,
wherein each optical waveguide path of the plurality of optical waveguide paths is dimensioned according to a figure of merit (FoM) to reduce a phase error, and wherein the FoM is defined by:

$$FoM = \frac{dneff}{dw}\sqrt{L},$$

wherein dneff denotes a variation in an effective refractive index of a waveguide transverse mode of an optical waveguide path, L denotes a total length of the optical waveguide path, and dw denotes a width variation of a width of the optical waveguide path.

* * * * *